United States Patent
Santucci et al.

(10) Patent No.: US 10,766,407 B2
(45) Date of Patent: *Sep. 8, 2020

(54) VEHICLE WITH CONTROLLABLE BRAKE LIGHT AND ELECTRONIC CONTROL METHOD OF THE BRAKE LIGHT

(71) Applicant: PIAGGIO & C. SPA, Pontedera (IT)

(72) Inventors: Mario Donato Santucci, Pontedera (IT); Onorino Di Tanna, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

This patent is subject to a terminal disclaimer.

(21) Appl. No.: 16/322,580

(22) PCT Filed: Aug. 3, 2017

(86) PCT No.: PCT/IB2017/054752
§ 371 (c)(1),
(2) Date: Feb. 1, 2019

(87) PCT Pub. No.: WO2018/025214
PCT Pub. Date: Feb. 8, 2018

(65) Prior Publication Data
US 2019/0168662 A1 Jun. 6, 2019

(30) Foreign Application Priority Data

Aug. 4, 2016 (IT) .......................... 102016000082255

(51) Int. Cl.
*F21V 23/00* (2015.01)
*B60Q 1/44* (2006.01)
(Continued)

(52) U.S. Cl.
CPC .................. *B60Q 1/44* (2013.01); *B62J 6/01* (2020.02); *B62J 6/04* (2013.01)

(58) Field of Classification Search
USPC ........................................................ 340/479
See application file for complete search history.

(56) References Cited

U.S. PATENT DOCUMENTS

| | | | | |
|---|---|---|---|---|
| 4,807,101 A | * | 2/1989 | Milde, Jr. ................ | B60Q 1/46 340/472 |
| 5,631,627 A | * | 5/1997 | Chou ..................... | B60Q 1/302 307/10.8 |

(Continued)

FOREIGN PATENT DOCUMENTS

| | | |
|---|---|---|
| CN | 204548382 U | 8/2015 |
| DE | 4123809 A1 | 1/1993 |

(Continued)

OTHER PUBLICATIONS

International Search Report for corresponding application PCT/IB2017/054752 filed Aug. 3, 2017; dated Sep. 9, 2017.

(Continued)

*Primary Examiner* — Brent Swarthout
(74) *Attorney, Agent, or Firm* — Cantor Colburn LLP

(57) ABSTRACT

A motorcycle including a body having a front part, a tail part and a central part between the front part and the tail part, front and rear wheels constrained to the body, a traction engine constrained to the body and operatively connected to at least one of the two wheels; a braking system, at least one front headlight fixed to the front part, at least one rear tail light fixed to the tail part, and at least one brake light fixed to the tail parts, an electronic control unit of the brake light operatively connected to the brake light adapted and configured to turn on the brake light upon the activation of the braking system, where the electronic control unit is adapted and configured to detect whether the speed of the motorcycle is either lower than or equal to a first threshold speed, and in that case turn on the brake light intermittently.

15 Claims, 2 Drawing Sheets

(51) Int. Cl.
*B62J 6/04* (2020.01)
*B62J 6/01* (2020.01)

(56) References Cited

U.S. PATENT DOCUMENTS

| | | | | |
|---|---|---|---|---|
| 2006/0232396 | A1* | 10/2006 | Oasem | B60Q 1/444 340/479 |
| 2008/0238648 | A1* | 10/2008 | Tewari | B60Q 1/444 340/469 |
| 2009/0051522 | A1 | 2/2009 | Perkins | |
| 2014/0288783 | A1* | 9/2014 | Kubotera | B60T 17/22 701/45 |
| 2019/0176689 | A1* | 6/2019 | Santucci | B62J 3/00 |

FOREIGN PATENT DOCUMENTS

| | | |
|---|---|---|
| DE | 202004016605 U1 | 2/2005 |
| GB | 2298534 A | 2/1995 |
| JP | 2007091148 A | 4/2007 |
| WO | 2016070961 A1 | 5/2016 |

OTHER PUBLICATIONS

Written Opinion for corresponding application PCT/IB2017/054752 filed Aug. 3, 2017; dated Sep. 9, 2017.

\* cited by examiner

VEHICLE WITH CONTROLLABLE BRAKE LIGHT AND ELECTRONIC CONTROL METHOD OF THE BRAKE LIGHT

TECHNICAL FIELD

The present disclosure relates to the technical field of motor vehicles, and in particular relates to a motorcycle comprising a controllable brake light and to a method for electronically controlling a brake light. The present disclosure also generally applies to the field of land vehicles.

BACKGROUND

Lighting systems which allow the safe use of motorcycles have been fitted on motorcycles for a long time. Motorcycles are indeed provided with a front headlight, a rear tail light, turn lights, at least one brake light etc. The front headlight allows to illuminate a ground area in front of the motorcycle and to make the motorcycle visible to people placed in front of the motorcycle. The rear tail light allows people behind the motorcycle to see the motorcycle and signals the activation of the brakes of the motorcycle. The brake light is used to signal braking in progress to the vehicles behind, in order to prevent collisions between adjacent vehicles or to reduce the risk of such collisions as much as possible. In particular, the brake light is automatically activated when the driver actuates the brake lever and/or the brake pedal.

Motorcycles are more prone to a risk of collision by the vehicles behind it than other vehicles, such as cars for example, because the rear tail light does not clearly define the presence or clearance of a motorcycle temporarily stopped on a carriageway in some cases or because redundancy of the rear tail light is not mandatory, the presence of the motorcycle may not be seen in the dark in case of a fault caused for example by the breakage or blowing of a bulb.

BRIEF SUMMARY

The description provides a vehicle having a controllable brake light which can overcome or at least partially reduce the problems of the prior art.

BRIEF DESCRIPTION OF THE DRAWINGS

The disclosure will be better understood through the following detailed description of the embodiments thereof, made by way of not limiting example, with reference to the accompanying drawings, in which.

DETAILED DESCRIPTION

Figure 1:
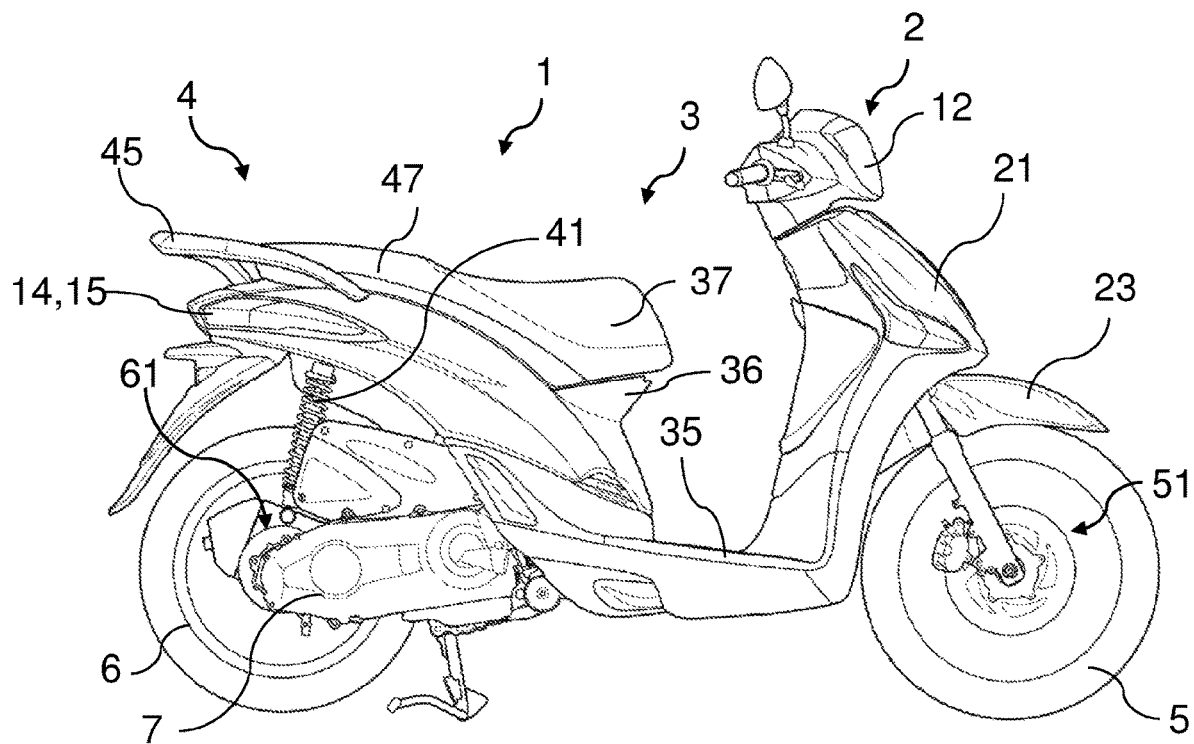
FIG. 1 shows a side view of a non-limiting embodiment of a motorcycle.
Figure 2:
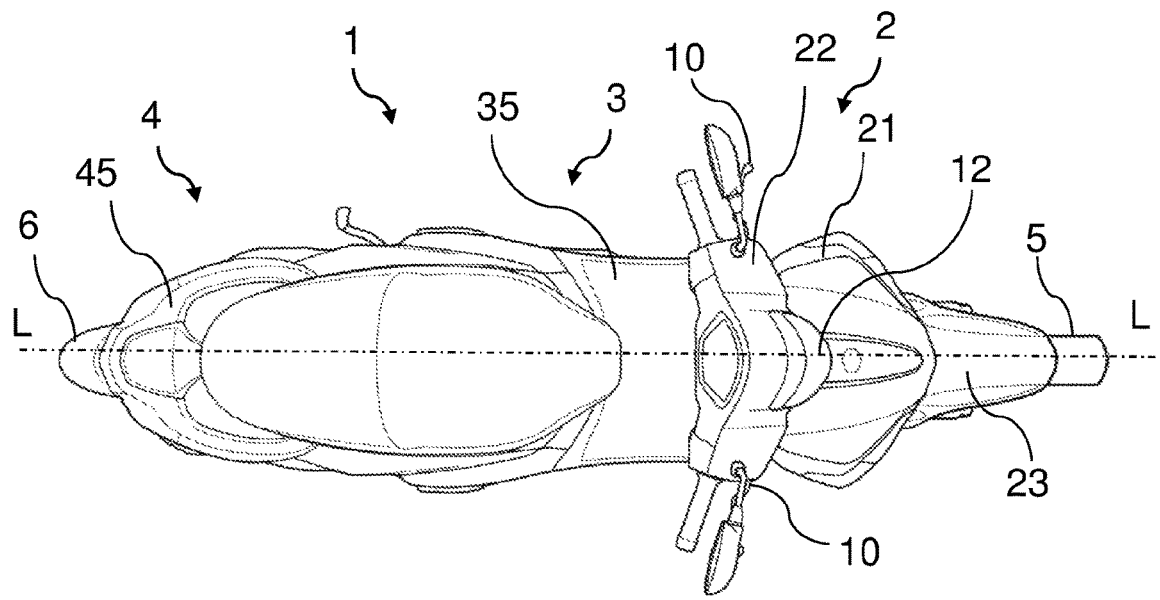
FIG. 2 shows a plan view of the motorcycle in FIG. 1.

Similar or equivalent elements in the accompanying figures are indicated by means of the same reference numerals.

An embodiment of a motorcycle 1 is shown in the accompanying figures, which in the particular example, without introducing any limitation, comprising a two-wheel motorcycle, and in particular of a two-wheel scooter, having a front wheel 5 and a rear wheel 6.

Hereinafter in the present description, reference will be made to a general motorcycle 1, hereby meaning that the following description may generally apply to any type of motorcycle 1 of category L comprising:

a motorcycle body 2,3,4;
at least two wheels 5,6 constrained to the motorcycle body 2,3,4;
a traction engine 7, e.g. thermal or electric or hybrid engine, constrained to the motorcycle body 2,3,4 and operatively connected to at least one of the wheels 5,6.

For example, the aforesaid motorcycle 1 is a two-wheel motorcycle, such as for example a scooter or a motorbike, or a three-wheel tricycle, at least two front wheels of which are steering and tilting, or a quadricycle with two pairs of tilting wheels, at least two of which are steering.

The motorcycle body 2,3,4 extends along a longitudinal axis L-L, which is parallel to the driving axis of the motorcycle 1, and has a front part 2, a tail part 4 and a central part 3 between the front part 2 and the tail part 4. The central part 3 is the part of the motorcycle 1 on which the rider's body resides arranged straddling the motorcycle 1 and/or sitting on the motorcycle 1 in a normal use and driving condition of the motorcycle 1. In the example, the central part comprises a platform 35, an under-saddle support 36 and a front portion 37 of the saddle. In the example, the front part 2 comprises a front shield 21, a steering handlebar 22, the front wheel 5, a braking device of the front wheel 51, a front mudguard 23. In the example, the rear part 4 comprises a rear portion 47 of the saddle, a parcel rack 45, one or two rear suspensions 41, the rear wheel 6, a braking device of the rear wheel 61, the traction engine 7.

The motorcycle 1 comprises at least one front headlight 12 fixed to the front part 2 and at least one rear tail light 14 fixed to the tail part 4 and directed in the opposite sense with respect to the front headlight 12. In a situation in which the steering handlebar 22 is not turned, i.e. in the condition in which the front wheel 5 and the rear wheel 6 are aligned along the longitudinal axis L-L, the headlight 12 is such as to emit an optical beam prevalently centered along the longitudinal axis L-L and directed towards a portion of the ground placed in front with respect to the motorcycle 1. The rear tail light 14 is such as to emit a non-directional optical radiation, generally concentrated at the height of the rear tail light itself, in order to avoid possible dazzling of the vehicles which follow the motorcycle 1.

The motorcycle 1 further comprises a braking system 101, a brake light 15 and an electronic control unit 100 of the brake light 15, which is operatively connected to the brake light 15 and adapted to turn on the brake light 15 when the braking system 101 is activated and to turn off the brake light 15 when the braking system 101 is deactivated. Said activation of the braking system 101 may be automatic or occur as a result of a force applied by the driver to a brake lever 10 and/or to a brake pedal. In the particular example shown in the figures, the motorcycle 1, being a scooter, comprises two brake levers 10 constrained to the steering handlebar 22, one of which is associated with the braking device of the front wheel 51 and the other is associated with the braking device of the rear wheel 61. In a variant embodiment, the motorcycle 1 could be a motorcycle having an actuating lever of the clutch instead of one of the brake levers 10, and in this case the motorcycle 1 would be provided with a brake pedal.

For example, the electronic control unit 100, as also the brake light 15, is powered by a battery 110 of the motorcycle 1.

According to a preferred, but not limiting embodiment, the electronic control unit 100 is the ECU (Engine Control Unit) of the motorcycle 1 and is such as to control also the traction engine 7 of the motorcycle 1. In the example in FIG. 3, the electronic control unit 100 is also such as to control other devices of the motorcycle 1, such as, for example, the front headlight 12 and the rear tail light 14.

The brake light 15 comprises, for example, an LED or incandescent lamp, distinct from the lamp of the rear tail light 14. In an alternative embodiment, the brake light 15 is integrated in the bulb or the tail light 14, the latter comprising, for example, a dedicated filament intended to work as brake light.

The brake light 15 and the tail light 14 are, for example, integrated in a same light cluster, named rear light cluster, fixed to the tail part 4 of the motorcycle body 2,3,4.

The electronic control unit 100 is adapted and configured to detect whether the speed of the motorcycle 1 is lower than or equal to a first threshold speed, and in that case turn on the brake light intermittently 15. According to an advantageous embodiment, the electronic control unit 100 is such as to turn on the brake light 15 intermittently and irrespective of the activation and deactivation of the braking system 101.

According to a preferred embodiment, the first threshold speed is of 3 km/h and more preferably is of 0 km/h.

Figure 3:
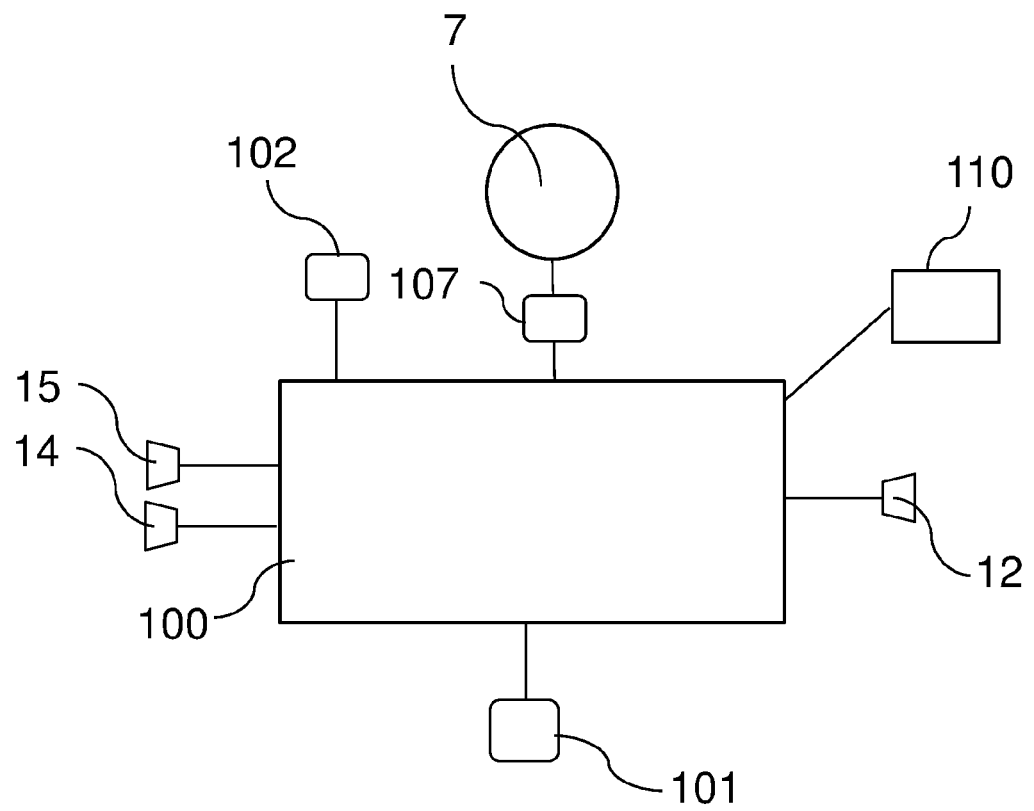
FIG. 3 shows a functional block chart of an embodiment of an electronic control system of the motorcycle in FIG. 1 provided by way of example.

According to an embodiment, with reference to FIG. 3, the electronic control unit 100 is such as to receive an electrical signal carrying information correlated with the speed of the motorcycle 1, for example from a speed sensor 102 included aboard the motorcycle 1 or operatively connected thereto.

According to an advantageous embodiment, the aforesaid intermittent lighting has a duty cycle with a light-on time different from the light-off time. Preferably, the light-on time is either double or half the light-off time. For example, the light-on time is of 1 second and the light-off time is of 0.5 seconds.

According to an advantageous embodiment, the electronic control unit 100 after the aforesaid intermittent lighting of the brake light 15 is such as to deactivate said intermittent lighting if it detects that the speed of the motorcycle 1 is higher than a second threshold speed, immediately after such detection or after a given monitoring interval, e.g. of 2 seconds, has elapsed. Preferably, the second threshold speed is higher than the first threshold speed, e.g. according to a non-limiting embodiment the second threshold speed is of 5 km/h. However, the first or the second threshold may also be equal.

According to a possible embodiment, if the motorcycle 1 is not provided with start-stop system, the electronic control unit 100 is such as to detect whether the traction engine 7 is in an on state or an off state and where the electronic control unit 100 is such as to turn on the brake light 15 intermittently if the speed of the motorcycle 1 is either lower than or equal to the first threshold speed and if the traction engine 7 is in the on state.

According to an embodiment alternative to the one described above, if the motorcycle 1 comprises a start-stop system 107 of the traction engine 7, the electronic control unit 100 is such as to detect whether the start-stop system 107 is in an activated state or in a deactivated state. When the start-stop system 107 is in activated state, the motorcycle 1 is stopped. The start-stop system 107 is deactivated, in the case of motorcycles 1 with automatic transmission, when the brake lever is released or, in the case of motorcycles 1 with manual transmission, when the clutch lever is pressed.

The electronic control unit 100 is such as to turn on the brake light 15 intermittently if the speed of the motorcycle 1 is either lower than or equal to the first threshold speed and if the start-stop system 107 is in the activated state.

In all the embodiments described above, the aforesaid intermittent lighting of the brake light 15 as described above is independent of the activation and deactivation of the braking system 101. Thereby, advantageously, when the motorcycle 1 has either stopped or nearly stopped, the driver of the motorcycle 1 will not keep the braking system 107 activated to determine an intermittent lighting of the brake light 15.

It is worth noting that the aforesaid description for the motorcycle 1 also corresponds to the description of a method for electronically controlling a brake light 15 of a motorcycle 1, where the motorcycle 1 comprises:

a motorcycle body 2,3,4 having a front part 2, a tail part 4 and a central part 3 between the front part 2 and the tail part 4;

at least two wheels 5,6, constrained to the motorcycle body 2,3,4, comprising a front wheel 5 and a rear wheel 6;

a traction engine 7, constrained to the motorcycle body 2,3,4 and operatively connected to at least one of the wheels 5,6;

a braking system 101;

at least one front headlight 12 fixed to the front part 2 and at least one rear tail light 14 fixed to the tail part 4;

a brake light 15 fixed to the tail part 4.

The control method of the brake light 15 comprises the steps of:

comparing the speed of the motorcycle 1 to a first threshold speed;

turning on the brake light 15 intermittently if the speed of the motorcycle 1 is either lower than or equal to the first threshold speed.

Preferably, the aforesaid electronic control method further comprises a step of turning on the brake light 15 upon the activation of the braking system 107 and turning it off upon the deactivation of the braking system 107. Preferably, the aforesaid intermittent lighting of the brake light 15 as described above is independent of the activation and deactivation of the braking system 101.

According to an advantageous embodiment, the aforesaid electronic control method further comprises a step of deactivating said intermediate lighting if it is detected that the speed of the motorcycle 1 is higher than a second threshold speed.

Further features of the aforesaid control method are apparent from the detailed description given above for the motorcycle 1.

On the basis of the foregoing explanation, it is thus possible to understand how a motorcycle 1 of the above-described type allows to achieve the aims indicated above with reference to the prior art. Indeed, by virtue of the particular control of the brake light 15, especially in the dark or in poor lighting conditions, the vehicles which follow the motorcycle 1 may more easily identify that the motorcycle is standing on a carriageway, thus avoiding running over it. It is also apparent from the foregoing description that the present solution is applicable with minor routine changes to four-wheel vehicles and not only to two/three-wheel motorcycles.

The principle of the disclosure being clear, embodiments and details may be greatly varied with respect to those described and disclosed herein exclusively by way of non-limiting example without departing from the scope of the disclosure as defined in the appended claims.

The invention claimed is:
1. A motorcycle, comprising:
a motorcycle body having a front part, a tail part and a central part between the front part and the tail part;

at least two wheels, constrained to the motorcycle body, comprising a front wheel and a rear wheel;
a traction engine, constrained to the motorcycle body and operatively connected to at least one of the wheels;
a braking system;
at least one front headlight fixed to the front part and at least one rear tail light fixed to the tail part;
a brake light fixed to the tail part;
an electronic control unit of the brake light operatively connected to the brake light adapted and configured to turn on the brake light upon the activation of the braking system;
a start-stop system of the traction engine;
wherein the electronic control unit is adapted and configured to detect whether the speed of the motorcycle is lower than or equal to a first threshold speed;
wherein the electronic control unit is configured to detect whether the start-stop system is in an activated state or in a deactivated state; and
wherein the electronic control unit is configured to turn on the brake light intermittently if the speed of the motorcycle is either lower than or equal to the first threshold speed and if the start-stop system is in the activated state.

2. A motorcycle according to claim 1, wherein the first threshold speed is 3 km/h.

3. A motorcycle according to claim 1, wherein the first threshold speed is 0 km/h.

4. A motorcycle according to claim 1, wherein said intermittent lighting has a duty cycle with a light-on time different from the light-off time.

5. A motorcycle according to claim 4, wherein the light-on time is either double or half the light-off time.

6. A motorcycle according to claim 5, wherein the light-on time is 1 second and the light-off time is 0.5 seconds.

7. A motorcycle according to ding claim 1, wherein the electronic control unit after said intermittent lighting of the brake light is configured to deactivate said intermittent lighting if it detects that the speed of the motorcycle is higher than a second threshold speed.

8. A motorcycle according to claim 7, wherein the second threshold speed is greater than the first threshold speed.

9. A motorcycle according to claim 8, wherein the second threshold speed is 5 km/h.

10. A motorcycle according to claim 1, wherein the electronic control unit is configured to detect whether the engine is in an on state or an off state and wherein the electronic control unit is configured to turn on the brake light intermittently if the speed of the motorcycle is either lower than or equal to the first threshold speed and if the engine is in the on state.

11. A motorcycle according to claim 1, wherein the electronic control unit is configured to turn on the brake light intermittently irrespective of the activation and deactivation of the braking system.

12. A method for electronically controlling a brake light of a motorcycle, wherein the motorcycle comprises:
a motorcycle body having a front part, a tail part and a central part between the front part and the tail part;
at least two wheels, constrained to the motorcycle body, comprising a front wheel and a rear wheel;
a traction engine, constrained to the motorcycle body and operatively connected to at least one of the wheels;
a braking system;
at least one front headlight fixed to the front part and at least one rear tail light fixed to the tail part;
a brake light fixed to the tail part;
a start-stop system of the traction engine;
wherein the control method comprises the steps of:
detecting whether the start-stop system is in an activated state or in a deactivated state;
comparing the speed of the motorcycle to a first threshold speed;
turning on the brake light intermittently if the speed of the motorcycle is either lower than or equal to the first threshold speed and if the start-stop system is in the activated state.

13. A control method according to claim 12, further comprising a step of turning on the brake light upon the activation of the braking system and turning it off upon the deactivation of the braking system.

14. A control method according to claim 12, wherein the step of turning on the brake light intermittently if the speed of the motorcycle is either lower than or equal to the first threshold speed occurs irrespective of the activation and deactivation of the braking system.

15. A control method according to claim 13, wherein the step of turning on the brake light intermittently if the speed of the motorcycle is either lower than or equal to the first threshold speed occurs irrespective of the activation and deactivation of the braking system.

* * * * *